United States Patent
Bates

(10) Patent No.: US 9,115,274 B2
(45) Date of Patent: *Aug. 25, 2015

(54) FIRE AND WATER RESISTANT CABLE COVER

(71) Applicant: General Cable Technologies Corporation, Highland Heights, KY (US)

(72) Inventor: Eric W. Bates, Lafayette, IN (US)

(73) Assignee: General Cable Technologies Corporation, Highland Heights, KY (US)

(*) Notice: Subject to any disclaimer, the term of this patent is extended or adjusted under 35 U.S.C. 154(b) by 0 days.

This patent is subject to a terminal disclaimer.

(21) Appl. No.: 13/713,535

(22) Filed: Dec. 13, 2012

(65) Prior Publication Data

US 2014/0166338 A1 Jun. 19, 2014

(51) Int. Cl.
*H01B 7/295* (2006.01)
*C08L 23/02* (2006.01)

(52) U.S. Cl.
CPC .............. *C08L 23/02* (2013.01); *H01B 7/295* (2013.01)

(58) Field of Classification Search
None
See application file for complete search history.

(56) References Cited

U.S. PATENT DOCUMENTS

| | | |
|---|---|---|
| 5,211,746 A | 5/1993 | Keogh et al. |
| 5,262,467 A | 11/1993 | Keogh et al. |
| 5,288,785 A | 2/1994 | Jow et al. |
| 5,482,990 A | 1/1996 | Jow et al. |
| 6,329,454 B1 | 12/2001 | Krabbenborg |
| 6,376,623 B1 | 4/2002 | Hoenig et al. |
| 6,451,894 B1 | 9/2002 | Srinivasan et al. |
| 2002/0108772 A1* | 8/2002 | Hase et al. ............... 174/120 C |
| 2009/0020311 A1 | 1/2009 | Park et al. |
| 2010/0132974 A1* | 6/2010 | Inagaki et al. .......... 174/110 SR |
| 2012/0244305 A1 | 9/2012 | Chen et al. |
| 2012/0273253 A1 | 11/2012 | Nilsson et al. |

FOREIGN PATENT DOCUMENTS

CN 102140192 8/2011
JP 2002/212378 7/2002

* cited by examiner

*Primary Examiner* — Sheeba Ahmed
(74) *Attorney, Agent, or Firm* — Ulmer & Berne LLP

(57) ABSTRACT

The present invention relates to cable covering compositions (insulation or jacket) for wires and cables that are fire and water resistant. Significantly, the composition contains no significant amount of lead, halogen, and antimony; and is flame retardant (UL 1685 Cable Tray burn test); and has excellent mechanical and water resistance properties. The covering composition contains (a) a polyolefin; (b) a maleic anhydride modified polyolefin; (c) a butadiene-styrene copolymer; (d) a non-halogen flame retardant; and (e) a silane compound.

20 Claims, No Drawings

FIRE AND WATER RESISTANT CABLE COVER

FIELD OF THE INVENTION

The present invention relates to cable covering compositions (insulation or jacket) for wires and cables that are fire and water resistant. Significantly, the composition contains no significant amount of lead, halogen, and antimony.

BACKGROUND OF THE INVENTION

Polymeric materials have been utilized in the past as electrical insulating materials for electrical cables. In services or products requiring long-term performance of an electrical cable, such polymeric materials, in addition to having suitable dielectric properties, must be durable. For example, polymeric insulation utilized in building wire, electrical motor or machinery power wires, or underground power transmitting cables, must be durable for safety and economic necessities and practicalities.

The most common polymeric insulators are made from either polyethylene homopolymers or ethylene-propylene elastomers, otherwise known as ethylene-propylene-rubber (EPR) and/or ethylene-propylene-diene ter-polymer (EPDM). Lead, such as lead oxide, has been used as water tree inhibitor and ion scavenger in fileed EPR or EPDM insulation; however, lead is toxic.

Coated cables which simultaneously have fire-resistance properties and moisture-resistance properties are also desirable. Typical fire retardants are used in the insulation. Halogenated additives (compounds based on fluorine, chlorine or bromine) or halogen containing polymers (e.g. polyvinyl chloride) are capable of giving fire-resistant properties to the polymer which forms the insulation, but has the drawback that the decomposition products of halogenated compounds are corrosive and harmful As a result, the use of halogens, especially for uses in closed locations, is not recommended.

Alternatively, or in combination with the halogens, an flame retardant additive, such as antimony oxides, can be added to an appropriate insulation polymer.

Therefore, there remains a need for an environmentally friendly moisture resistant and fire resistant cable insulation that is lead free, halogen free, and antimony free.

SUMMARY OF THE INVENTION

An object of the present invention is to provide a halogen-free, lead-free, and antimony-free composition, useful as a covering material (insulation or jacket) for electrical cables, which is flame retardant (UL 1685 Cable Tray burn test) and has excellent mechanical and water resistance properties.

The invention provides a cable covering composition (insulation or jacket) for electric cable containing (a) a polyolefin; (b) a maleic anhydride modified polyolefin; (c) a butadiene-styrene copolymer; (d) a non-halogen flame retardant; and (e) a silane compound. Advantageously, the composition is lead-free, halogen-free, and antimony-free. The phrase "lead-free" or "no significant amount of lead" or the like, as used herein, refers to a lead content of less than 1000 parts per million (ppm) based on the total composition, preferably less than 300 ppm, most preferably undetectable using current analytical techniques. The phrase "halogen-free" or "no significant amount of halogen" or the like, as used herein, refers to a halogen content of less than 1000 ppm, preferably less than 300 ppm, most preferably undetectable using current analytical techniques. The phrase "antimony-free" or "no significant amount of antimony" or the like, as used herein, refers to an antimony content of less than 1000 ppm, preferably less than 300 ppm, most preferably undetectable using current analytical techniques.

The invention also provides an electric cable containing an electrical conductor surrounded by an insulation. The insulation contains (a) a polyolefin; (b) a maleic anhydride modified polyolefin; (c) a butyldiene-styrene copolymer; (d) a non-halogen flame retardant; and (e) a silane compound. Preferably, the conductor is covered with only a single layer of insulation, not requiring multiple layers.

The invention also provides methods for making a polymer compound containing (a) a polyolefin; (b) a maleic anhydride modified polyolefin; (c) a butyldiene-styrene copolymer; (d) a non-halogen flame retardant; and (e) a silane compound.

DETAILED DESCRIPTION OF THE PREFERRED EMBODIMENTS

The composition of the present invention contains a polyolefin base polymer and an additive. Polyolefins, as used herein, are polymers produced from alkenes having the general formula $C_nH_{2n}$.

Within the broad definition above, non-limiting examples of polyolefins suitable for the present invention include polyethylene (including low-density (LDPE), high-density, high molecular weight (HDPE), ultra-high molecular weight (UHDPE), linear-low-density (LLDPE), very-low density, etc.), maleated polypropylene, polypropylene, polybutylene, polyhexalene, polyoctene, and copolymers thereof, and ethylene-vinyl-acetate (EVA) copolymer, and mixtures, blends or alloys thereof.

Metallocene-catalyzed olefin copolymers may constitute another polymer in the polymer alloy of the present invention. Those copolymers are included in the alloy to provide a modification of the modulus of the polyolefin and to otherwise assist in the processability of the polyolefins during manufacture.

Such metallocene-catalyzed olefin copolymers are well known in the art, such as disclosed in U.S. Pat. Nos. 6,451,894; 6,376,623; and 6,329,454. Such copolymers are available from a number of commercial sources, among them being ExxonMobil and Dow Elastomers.

It is well known that metallocene catalysis can yield quite precise polymeric structures. Within the possibilities of olefin monomers used in the copolymerization, it is preferred to use ethylene with a second olefin monomer having from 3 to 18 carbon atoms. Of the comonomer choices, octene is preferred because of the variation possible in melt flow properties of the resulting copolymer.

The base polymer utilized in the covering composition (e.g. insulation or jacket) for electric cables in accordance with the invention may also be selected from the group of polymers consisting of ethylene polymerized with at least one comonomer selected from the group consisting of $C_3$ to $C_{20}$ alpha-olefins and $C_3$ to $C_{20}$ polyenes. Generally, the alpha-olefins suitable for use in the invention contain in the range of about 3 to about 20 carbon atoms. Preferably, the alpha-olefins contain in the range of about 3 to about 16 carbon atoms, most preferably in the range of about 3 to about 8 carbon atoms. Illustrative non-limiting examples of such alpha-olefins are propylene, 1-butene, 1-pentene, 1-hexene, 1-octene and 1-dodecene.

The polymers may include either ethylene/alpha-olefin copolymers or ethylene/alpha-olefin/diene terpolymers. The polyene utilized in the invention generally has about 3 to about 20 carbon atoms. The polyene has in the range of about 4 to about 20 carbon atoms, most preferably in the range of about 4 to about 15 carbon atoms. The polyene may be a diene, which can be a straight chain, branched chain, or cyclic hydrocarbon diene. Most preferably, the diene is a non conjugated diene. Examples of suitable dienes are straight chain acyclic dienes such as: 1,3-butadiene, 1,4-hexadiene and 1,6-octadiene; branched chain acyclic dienes such as: 5-methyl-1,4-hexadiene, 3,7-dimethyl-1,6-octadiene, 3,7-dimethyl-1, 7-octadiene and mixed isomers of dihydro myricene and dihydroocinene; single ring alicyclic dienes such as: 1,3-cyclopentadiene, 1,4-cylcohexadiene, 1,5-cyclooctadiene and 1,5-cyclododecadiene; and multi-ring alicyclic fused and bridged ring dienes such as: tetrahydroindene, methyl tetrahydroindene, dicylcopentadiene, bicyclo-(2,2,1)-hepta-2-5-diene; alkenyl, alkylidene, cycloalkenyl and cycloalkylidene norbornenes such as 5-methylene-2morbornene (MNB), 5-propenyl-2-norbornene, 5-isopropylidene-2-norbornene, 5-(4-cyclopentenyl)-2-norbornene, 5-cyclohexylidene-2-norbornene, and norbornene. Of the dienes typically used to prepare EPR's, the particularly preferred dienes are 1,4-hexadiene, 5-ethylidene-2-norbornene, 5-vinyllidene-2-norbornene, 5-methylene-2-norbornene and dicyclopentadiene.

As an additional polymer in the base polymer composition, a non-metallocene base polymer may be used having the structural formula of any of the polyolefins or polyolefin copolymers described above. Ethylene-propylene rubber (EPR), polyethylene, polypropylene or ethylene vinyl acetates having a range of vinyl acetate content of from about 10% to about 60% may all be used in combination with the other polymers in the base polymer to give other desired properties in the base polymer. As stated above, however, combinations of factors such as cost and availability of raw materials, and end user requirements for certain environments may dictate certain compositions or cause certain embodiments to be preferred in certain circumstances which under other circumstances they might not be.

The preferred base polymer is a metallocene-catalyzed olefin. The base polymer is preferably present at about 20 to about 50% by weight of the composition, more preferably about 20 to about 40%, and most preferably about 25 to about 35%.

The composition of the present invention also includes a maleic anhydride modified polyolefin (MAMP). Any of the polyolefin mentioned above for the base polymer is appropriate for modification here. Maleic anhydride modified polyethylene is preferably used in the composition, and is available commercially as Lotader, Fusabond, Orevac, or Elvaloy. The MAMP is preferably present at about 1 to about 15% by weight of the composition, more preferably about 1 to about 5%, and most preferably about 1.5 to about 4%.

The composition of the present invention also includes a butadiene-styrene copolymer, preferably present at about 0.5 to about 20% by weight of the composition, more preferably about 0.5 to about 8%, and most preferably about 1 to about 3%. The copolymer preferably has a styrene content of about 20-30% by weight. In one embodiment, the styrene copolymer can include, for example, a block copolymer made from styrene and butadiene. In another embodiment, the styrene copolymer contains a random arrangement of styrene and butadiene. In a preferred embodiment, the styrene copolymer is a random arrangement of styrene and ethylene Butadiene-styrene copolymer is available commercially, for example, as Ricon, Solprene, Synpol, Stereon, or Pliolite.

The composition of the present invention also includes a non-halogen flame retardant. The non-halogen flame retardant, can include, for example, inorganic flame retarders, such as aluminum hydroxide and magnesium hydroxide; and/or phosphorus flame retarders, such as phosphoric acid compounds, polyphosphoric acid compounds, and red phosphorus compounds. The flame retarder is preferably present at about 30 to about 75% by weight of the composition, more preferably about 40 to about 65%, and most preferably about 45 to about 60%. The preferred flame retarder is magnesium hydroxide, and more preferably untreated, low ionic content magnesium hydroxide. The magnesium hydroxide preferably has an average particle size of about 0.5 to 3.0 microns, more preferably about 0.8 to 2.0, most preferably about 0.8 to 1.2. Commercially available magnesium hydroxide appropriate for the present invention include Zerogen, Magnifin, ICL FR20, and Kisuma The composition of the present invention also includes a silane compound, preferably an organosilane. Examples of the silane compound may include, but is not limited to, γ-methacryloxypropyltrimethoxysilane, methyltriethoxysilane, methyltris(2-methoxyethoxy)silane, dimethyldiethoxysilane, vinyltris(2-methoxyethoxy)silane, vinyltrimethoxysilane, vinyltriethoxysilane, octyltriethoxysilane, isobutyltriethoxysilane, isobutyltrimethoxysilane, propyltriethoxysilane, and mixtures or polymers thereof. The silane compound is preferably present at about 0.2 to about 5% by weight of the composition, more preferably about 0.3 to about 3%, and most preferably about 0.5 to about 2%. The preferred silane compound is a polymer of vinyltriethoxysilane and propyltriethoxysilane.

The composition of the present invention may also include a crosslinking agent. Peroxides are preferably used as a crosslinking agent and may be, but are not limited to, α,α'-bis(tert-butylperoxy)diisopropylbenzene, di(tert-butylperoxyisopropyl)benzene, and dicumyl peroxide, tert-butylcumyl peroxide. In place of the peroxide or in substitution of the peroxide, other curing methods may be used, including Electron-beam irradiation. The crosslinking agent is preferably present at about 0.1 to about 5% by weight of the composition, more preferably about 0.3 to about 2%, and most preferably about 0.3 to about 1.0%. The preferred crosslinking agent is a blend of 1,1-dimethylethyl 1-methyl-1-phenylethyl peroxide, bis(1-methyl-1-phenylethyl) peroxide, and [1,3(or 1,4)-phenylenebis(1-methylethylidene)]bis[(1,1-dimethylethyl) peroxide.

The composition of the present invention may also include other additives that are generally used in insulated wires or cables, such as a filler, an antioxidant, a processing aid, a colorant, and a stabilizer in the ranges where the object of the present invention is not impaired.

The filler, may be, for example, carbon black, clay (preferably treated or untreated anhydrous aluminum silicate), zinc oxide, tin oxides, magnesium oxide, molybdenum oxides, antimony trioxide, silica (preferably precipitated silica or hydrophilic fumed silica), talc, The filler is preferably present at about 0 to about 40% by weight of the composition, more preferably about 0 to about 30%, and most preferably about 5 to about 15%. The preferred filler is silane treated aluminum silicate (clay), which is commercially available as Translink, Polyfil, or Polarite.

The antioxidant, may include, for example, amine-antioxidants, such as 4,4'-dioctyl diphenylamine, N,N'-diphenyl-p-phenylenediamine, and polymers of 2,2,4-trimethyl-1,2-dihydroquinoline; phenolic antioxidants, such as thiodiethylene bis[3-(3,5-di-tert-butyl-4-hydroxyphenyl) propionate], 4,4'-thiobis(2-tert-butyl-5-methylphenol), 2,2'-thiobis(4-methyl-6-tert-butyl-phenol), benzenepropanoic acid, 3,5 bis(1,1 dimethylethyl)4-hydroxy benzenepropanoic acid, 3,5-bis(1,1-dimethylethyl)-4-hydroxy-C13-15 branched and linear alkyl esters, 3,5-di-tert-butyl-4hydroxy-hydrocinnamic acid C7-9-Branched alkyl ester, 2,4-dimethyl-6-t-butylphenol Tetrakis{methylene3-(3',5'-ditert-butyl-4'-hydroxyphenol)propionate}metha-ne or Tetrakis {methylene3-(3',5'-ditert-butyl-4'-hydrocinnamate}methane, 1,1,3tris(2-methyl-4hydroxyl5butylphenyl)butane, 2,5,di t-amyl hydroqunone, 1,3,5-tri methyl2,4,6tris(3,5di tert butyl4hydroxybenzyl) benzene, 1,3,5tris(3,5di tert butyl4hydroxybenzyl)isocyanurate, 2,2Methylene-bis-(4-methyl-6-tert butyl-phenol), 6,6'-di-tert-butyl-2,2'-thiodi-p-cresol or 2,2'-thiobis(4-methyl-6-tert-butylphenol), 2,2ethylenebis(4,6-di-t-butylphenol), triethyleneglycol bis{3-(3-t-butyl-4-hydroxy-5methylphenyl)propionate}, 1,3,5tris(4tert butyl3hydroxy-2,6-dimethylbenzyl)-1,3,5-triazine-2,4,6-(1H,3H,5H)trione, 2,2methylenebis{6-(1-methylcyclohexyl)-p-cresol}; and/or sulfur antioxidants, such as bis(2-methyl-4-(3-n-alkylthiopropionyloxy)-5-t-butylphenyl)sulfide, 2-mercaptobenzimidazole and its zinc salts, and pentaerythritol-tetrakis(3-lauryl-thiopropionate). The antioxidant is preferably present at about 0.1 to about 10% by weight of the composition, more preferably about 0.2 to about 5%, and most preferably about 0.5 to about 2%. The preferred antioxidant is a blend of zinc 2-mercapto-benzimidazole and/or polymeric 2,2,4-trimethyl-1,2-dihydroquino line.

The processing aid is optionally used to improve processability of the polymer. A processing aid forms a microscopic dispersed phase within the polymer carrier. During processing, the applied shear separates the process aid phase from the carrier polymer phase. The process aid then migrates to the die wall gradually forming a continuous coating layer to reduce the backpressure of the extruder, thereby reducing friction during extrusion. The processing aid is generally a lubricant, such as, but not limited to, stearic acid, silicones, anti-static amines, organic amities, ethanolamides, mono- and di-glyceride fatty amines, ethoxylated fatty amines, fatty acids, zinc stearate, stearic acids, palmitic acids, calcium stearate, zinc sulfate, oligomeric olefin oil, and combinations thereof. The process aid is preferably present at less than about 10% by weight of the composition, more preferably less than about 5%, and most preferably less than about 1%. The preferred process aid is a blend of fatty acids, available commercially as Struktol, Ultraflow, Moldwiz, or Aflux.

The compositions of the invention can be prepared by blending the components by use of conventional masticating equipment, for example, a rubber mill, Brabender Mixer, Banbury Mixer, Buss-Ko Kneader, Farrel continuous mixer or twin screw continuous mixer. The additives are preferably premixed before addition to the base polyolefin polymer. Mixing times should be sufficient to obtain homogeneous blends. All of the components of the compositions utilized in the invention are usually blended or compounded together prior to their introduction into an extrusion device from which they are to be extruded onto an electrical conductor.

After the various components of the composition are uniformly admixed and blended together, they are further processed to fabricate the cables of the invention. Prior art methods for fabricating polymer cable insulation or cable jacket are well known, and fabrication of the cable of the invention may generally be accomplished by any of the various extrusion methods.

In a typical extrusion method, an optionally heated conducting core to be coated is pulled through a heated extrusion die, generally a cross-head die, in which a layer of melted polymer is applied to the conducting core. Upon exiting the die, if the polymer is adapted as a thermoset composition, the conducting core with the applied polymer layer may be passed through a heated vulcanizing section, or continuous vulcanizing section and then a cooling section, generally an elongated cooling bath, to cool. Multiple polymer layers may be applied by consecutive extrusion steps in which an additional layer is added in each step, or with the proper type of die, multiple polymer layers may be applied simultaneously.

The conductor of the invention may generally comprise any suitable electrically conducting material, although generally electrically conducting metals are utilized. Preferably, the metals utilized are copper or aluminum.

Without further description, it is believed that one of ordinary skill in the art can, using the preceding description and the following illustrative example, make and utilize the compounds of the present invention and practice the claimed methods. The following example is given to illustrate the present invention. It should be understood that the invention is not to be limited to the specific conditions or details described in this example.

EXAMPLES

Several compositions were made in accordance to the present inventions. Those compositions and are shown in Table 1 and are named IA, IB, IC, and ID.

TABLE 1

(all components are indicated as parts by weight)

| Components | IA | IB | IC | ID |
|---|---|---|---|---|
| Metallocene catalyzed polyolefin | 80 | 90 | 80 | 100 |
| Maleic Anhydride grafted polyethylene* | 20 | 10 | | |
| Maleic Anhydride grafted polyethylene** | | | 20 | |
| Magnesium Hydroxide | 155 | 155 | 155 | 155 |
| Silane treated kaolin | 30 | 30 | 30 | 30 |
| 50% Silane dispersion in wax | 6.60 | 6.60 | 6.60 | 6.60 |
| Antioxidant | 4.50 | 4.50 | 4.50 | 4.50 |
| Process aid (blend of fatty acids) | 2.00 | 2.00 | 2.00 | 2.00 |
| Process aid (oligomeric olefin oil) | 5.00 | | 5.00 | |
| Polybutadiene styrene copolymer | 6.00 | 6.00 | 6.00 | 6.00 |
| Peroxide | 1.60 | 1.60 | 1.60 | 1.60 |
| Total | 310.7 | 305.7 | 310.7 | 305.7 |

*density: 0.93 g/cm³, melt flow rate (190° C./2.16 kg): 1.75 g/10 min.;
**density: 0.922 g/cm³, melt flow rate (190° C./2.16 kg): 6.7 g/10 min.

Table 2 shows the physical and electrical properties of compositions IA to ID. Tensile strenth and elongation was measured in accordance to ASTM D412 (2010) or D638 (2010) using a Zwick universal testing machine or an Instron Tester. Long term insulation resistance (LTIR) at 90° C. was measured in accordance to UL 44 (2010). Relative permittivity/capacitance increase at 90° C. were tested in accordance to UL 44 (2010).

TABLE 2

| Properties | IA | IB | IC | ID |
|---|---|---|---|---|
| Tensile (PSI) | 1878 | 1771 | 2029 | 1343 |
| Elongation (%) | 239 | 256 | 243 | 249 |
| Processability | Excellent | Excellent | Excellent | Excellent |
| LTIR | Fail | Pass | Fail | Pass |
| Rel. perm./Cap. Incr. | Pass | Pass | Pass | Pass |

A composition identical to IB (except that the peroxide was increased to 2.3 parts by weight) was selected for UL fire testing. Two cable samples (1/0 AWG) were made and tested in accordance to UL 1685 (2007). The test result is summarized in Table 3.

TABLE 3

|  | Sample 1 | Sample 2 | Requirement |
| --- | --- | --- | --- |
| Char/cable damage height | 4 ft. 10 in. | 4 ft. 8 in. | 8 ft. max. |
| Total smoke released (20 minutes) | 18.2 m$^2$ | 16.4 m$^2$ | 95 m$^2$ max. |
| Peak Smoke release rate | 0.07 m$^2$/s | 0.08 m$^2$/s | 0.25 m$^2$/s max. |

It is apparent from Table 3 that both samples performed within the limits prescribed by UL 1685 (2007) and passed those requirements.

Although certain presently preferred embodiments of the invention have been specifically described herein, it will be apparent to those skilled in the art to which the invention pertains that variations and modifications of the various embodiments shown and described herein may be made without departing from the spirit and scope of the invention. Accordingly, it is intended that the invention be limited only to the extent required by the appended claims and the applicable rules of law.

What is claimed is:

1. A composition comprising:
   a) a polyolefin;
   b) a maleic anhydride modified polyolefin;
   c) a butadiene-styrene copolymer;
   d) a non-halogen flame retardant; and
   e) a silane compound,
   wherein the composition is lead-free, halogen-free, antimony-free, and satisfies requirements for long term insulation resistance (LTIR) at 90° C. in accordance to UL 44.

2. The composition of claim 1, wherein component a) is present at about 20 to about 50% by weight of the composition, component b) is present at about 1 to about 15% by weight of the composition, component c) is present at about 0.5 to about 20% by weight of the composition, component d) is present at about 30 to about 75% by weight of the composition, or component e) is present at about 0.2 to about 5% by weight of the composition.

3. The composition of claim 1, wherein component a) is ethylene butene, component b) is maleic anhydride modified polyethylene, component c) has a styrene content of about 20-30% by weight, component d) is magnesium hydroxide, or component e) is a polymer of vinyltriethoxysilane and propyltriethoxysilane.

4. The composition of claim 1, further comprising a crosslinking agent, a filler, an antioxidant, or a processing aid.

5. The composition of claim 4, wherein the crosslinking agent is present at about 0.1 to about 5% by weight of the composition.

6. The composition of claim 4, wherein the filler is present at less than about 40% by weight of the composition.

7. The composition of claim 4, wherein the antioxidant is present at about 0.1 to about 10% by weight of the composition.

8. The composition of claim 4, wherein the processing aid is present at less than about 10% by weight of the composition.

9. The composition of claim 4, wherein the crosslinking agent is a peroxide, the filler is a silane treated aluminum silicate, the antioxidant is a combination of zinc 2-mercaptobenzimidazole and polymers of 2,2,4-trimethyl-1,2-dihydroquinoline, or the processing aid is fatty acid esters.

10. A cable comprising a conductor and a covering, the covering formed of a lead-free, halogen-free, and antimony-free composition comprising:
    a) a polyolefin;
    b) a maleic anhydride modified polyolefin;
    c) a butadiene-styrene copolymer;
    d) a non-halogen flame retardant; and
    e) a silane compound,
    wherein the covering satisfies requirements for long term insulation resistance (LTIR) at 90° C. in accordance to UL 44.

11. The cable of claim 10, wherein the covering is an insulation or a jacket.

12. The cable of claim 10, wherein component a) is present at about 20 to about 50% by weight of the composition, component b) is present at about 1 to about 15% by weight of the composition, component c) is present at about 0.5 to about 20% by weight of the composition, component d) is present at about 30 to about 75% by weight of the composition, or component e) is present at about 0.2 to about 5% by weight of the composition.

13. The cable of claim 10, wherein component a) is ethylene butene, component b) is maleic anhydride modified polyethylene, component c) has a styrene content of about 20-30% by weight, component d) is magnesium hydroxide, or component e) is a polymer of vinyltriethoxysilane and propyltriethoxysilane.

14. The cable of claim 10, further comprising a crosslinking agent, a filler, an antioxidant, or a processing aid.

15. The cable of claim 14, wherein the crosslinking agent is present at about 0.1 to about 5% by weight of the composition.

16. The cable of claim 14, wherein the filler is present at less than about 40% by weight of the composition.

17. The cable of claim 14, wherein the antioxidant is present at about 0.1 to about 10% by weight of the composition.

18. The cable of claim 14, wherein the processing aid is present at less than about 10% by weight of the composition.

19. The cable of claim 14, wherein the crosslinking agent is a peroxide, the filler is a silane treated aluminum silicate, the antioxidant is a combination of zinc 2-mercaptobenzimidazole and polymers of 2,2,4-trimethyl-1,2-dihydroquinoline, or the processing aid is fatty acid esters.

20. A lead-free, halogen-free, antimony-free composition comprising:
    a) from about 20% to about 50%, by weight of the composition, of an ethylene-butene copolymer;
    b) from about 1% to about 15%, by weight of the composition, of a maleic anhydride grafted polyethylene;
    c) from about 0.5% to about 20%, by weight of the composition, of a butadiene-styrene copolymer;
    d) from about 30% to about 75%, by weight of the composition, of a non-halogen flame retardant;
    e) from about 0.2% to about 5%, by weight of the composition, of a silane compound; and
    f) from about 0.1% to about 5%, by weight of the composition, of a crosslinking agent,
    wherein the composition satisfies requirements for long term insulation resistance (LTIR) at 90° C. in accordance to UL 44.

* * * * *